(12) United States Patent
Brockmeyer et al.

(10) Patent No.: US 8,039,549 B2
(45) Date of Patent: Oct. 18, 2011

(54) METHOD FOR PRODUCING AQUEOUS POLYMER DISPERSIONS CONTAINING AT LEAST ONE LIPOPHILIC ACTIVE SUBSTANCE AND THE USE THEREOF

(75) Inventors: Andreas Brockmeyer, Bickenbach (DE); Roland Ettl, Ketsch (DE); Rainer Dyllick-Brenzinger, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 287 days.

(21) Appl. No.: 12/305,976

(22) PCT Filed: Jun. 5, 2007

(86) PCT No.: PCT/EP2007/055499
§ 371 (c)(1),
(2), (4) Date: Dec. 22, 2008

(87) PCT Pub. No.: WO2007/147726
PCT Pub. Date: Dec. 27, 2007

(65) Prior Publication Data
US 2009/0178773 A1    Jul. 16, 2009

(30) Foreign Application Priority Data
Jun. 20, 2006   (EP) .................... 06115714

(51) Int. Cl.
    C08L 89/00   (2006.01)
(52) U.S. Cl. ...................................... 524/704
(58) Field of Classification Search .............. 162/168.1; 524/704, 734, 745, 752, 770, 773, 824
See application file for complete search history.

(56) References Cited

U.S. PATENT DOCUMENTS

| | | | |
|---|---|---|---|
| 3,400,093 A | 9/1968 | Feinberg | |
| 6,727,305 B1 | 4/2004 | Pavez Aranguiz | |
| 6,727,318 B1 | 4/2004 | Mathauer et al. | |
| 7,176,255 B2 | 2/2007 | Mathauer et al. | |
| 2002/0131941 A1 | 9/2002 | Habeck et al. | |
| 2006/0009571 A1 | 1/2006 | Dyllick-Brenzinger et al. | |
| 2006/0058430 A1 | 3/2006 | Dyllick-Brenzinger et al. | |
| 2007/0218089 A1 | 9/2007 | Dyllick-Brenzinger et al. | |
| 2008/0146448 A1 | 6/2008 | Dyllick-Brenzinger et al. | |
| 2008/0171658 A1 | 7/2008 | Dyllick-Brenzinger et al. | |
| 2008/0213326 A1 | 9/2008 | Amrhein et al. | |
| 2008/0262154 A1 | 10/2008 | Behrens et al. | |
| 2009/0188054 A1* | 7/2009 | Dyllick-Brenzinger et al. | 8/115.6 |

FOREIGN PATENT DOCUMENTS

| | | |
|---|---|---|
| DE | 199 59 916 A1 | 7/2000 |
| DE | 102 48 879 A1 | 4/2004 |
| DE | 102 54 548 A1 | 6/2004 |
| EP | 0 209 879 A2 | 1/1987 |
| EP | 0 694 597 A1 | 1/1996 |
| EP | 0 875 544 A1 | 11/1998 |
| EP | 1 191 041 A2 | 3/2002 |
| JP | 7-292009 | 11/1995 |
| WO | WO 99/40123 | 8/1999 |
| WO | WO 01/10936 A1 | 2/2001 |
| WO | WO 2005/070912 A1 | 8/2005 |
| WO | WO 2005/087816 A1 | 9/2005 |
| WO | WO 2006/015791 A2 | 2/2006 |
| WO | WO 2006/094526 A1 | 9/2006 |
| WO | WO 2006/094978 A2 | 9/2006 |
| WO | WO 2007/074041 A1 | 7/2007 |

OTHER PUBLICATIONS

U.S. Appl. No. 12/517,360, filed Jun. 3, 2009, Jung, et al.
U.S. Appl. No. 12/439,928, filed Mar. 4, 2009, Dyllick-Brenzinger, et al.

* cited by examiner

*Primary Examiner* — Mark Halpern
(74) *Attorney, Agent, or Firm* — Oblon, Spivak, McClelland, Maier & Neustadt, L.L.P.

(57) ABSTRACT

A process for the preparation of aqueous polymer dispersions comprising at least one lipophilic active substance by emulsion polymerization of ethylenically unsaturated monomers in an aqueous medium in the presence of at least one lipophilic active substance, wherein
  (i) at least one lipophilic active substance which has a water solubility of not more than 5 g/l (determined at 25° C. and 1013 mbar) and a melting point below 130° C. is emulsified in an aqueous solution which comprises at least one dispersion stabilizer with formation of an aqueous dispersion of the active substance having a mean particle size of not more than 1000 nm and
  (ii) a monomer composition which comprises at least 80% by weight of a neutral, monoethylenically unsaturated monomer emulsifiable in water is subjected to an emulsion polymerization in the aqueous dispersion of the active substance which is obtained according to (i), and
use of the dispersions thus obtainable as sizes for paper, board and cardboard, for the treatment and for the stabilization of thermoplastic polymers, for material protection and for crop protection.

15 Claims, No Drawings

METHOD FOR PRODUCING AQUEOUS POLYMER DISPERSIONS CONTAINING AT LEAST ONE LIPOPHILIC ACTIVE SUBSTANCE AND THE USE THEREOF

The invention relates to a process for the preparation of aqueous polymer dispersions comprising at least one lipophilic active substance by emulsion polymerization of ethylenically unsaturated monomers in an aqueous medium in the presence of at least one lipophilic active substance and to the use of the dispersions thus obtainable as size for paper, board and cardboard, for the treatment and for the stabilization of thermoplastic polymers, for material protection and for crop protection.

In technical usage, active substances are generally understood as meaning substances which display the desired effect in the respective intended application even in low concentration. In all cases, it is necessary to distribute a small amount of an active substance as uniformly as possible in a large amount of another substance or over a large area. Thus, so-called UV absorbers are used, for example, for the protection of materials, such as polymers, from the action of UV rays. Further examples of active substances are the substances used as sizes for paper, such as alkyldiketenes, alkenylsuccinic anhydrides and rosin size, and active substances for crop protection, such as herbicides, fungicides, insecticides and growth regulators. These active substances are lipophilic and therefore virtually insoluble in water. However, in order to use them for the desired purpose, they must be present in finely divided form. There are various methods for the application of such products.

For example, UV absorbers are incorporated into a polymer by melting said polymer and mixing the melt with the UV absorber under the action of shear forces. On the other hand, sizes for paper are used—as in the case of lipophilic active substances for crop protection—in the form of a dilute aqueous dispersion. The dispersions are generally diluted with water to the respective application concentration shortly before use. The lipophilic active substances are present as an emulsified or dispersed phase in a continuous aqueous phase. Such aqueous dispersions always comprise a dispersion stabilizer which stabilizes the essentially metastable systems. Aqueous dispersions of lipophilic active substances can be prepared, for example, by two different polymerization processes, namely by the emulsion polymerization process or the miniemulsion polymerization process.

Thus, for example, JP-A-7-292009 discloses aqueous polymer dispersions which comprise functional substances, such as, in particular, UV absorbers or epoxy resins. They are prepared by dissolving the functional substances in an unsaturated monomer, emulsifying this solution in water in the presence of a surface-active agent to give a monomer emulsion having mean particle sizes of from 5 to 500 nm and polymerizing the miniemulsion in the presence of a free radical initiator.

The aqueous dispersions which comprise the functional substances, such as UV absorbers, epoxy resins, acrylate-based polymers, phenol resins, unsaturated polyesters, phenol-based substances and mineral oil resins, are used as a binder and as an additive for protective coating films.

WO-A-99/40123 discloses a process for the preparation of aqueous polymer dispersions whose dispersed polymer particles comprise an organic dye distributed homogeneously, i.e. in molecular disperse form. Such aqueous dispersions are prepared by miniemulsion polymerization, by polymerizing ethylenically unsaturated monomers which comprise a dissolved organic dye in the form of an oil-in-water emulsion in the presence of free radical polymerization initiators, the disperse phase of the emulsion being formed substantially by dye-containing monomer droplets having a diameter of <500 nm. In an advantageous embodiment of the invention, monomer mixtures which comprise crosslinking monomers are used in the polymerization. The polymer dispersions are stable to sedimentation. The dispersed particles have a mean particle size of from 100 to 400 nm. They can be obtained from the aqueous dispersions with the aid of conventional drying methods. The dye-containing polymer dispersions are used, for example, for pigmenting high molecular weight organic and inorganic materials and for pigmenting printing inks and inks for inkjet printing.

Further colorant-containing polymer dispersions whose colorant-containing polymer particles have a mean particle diameter below 1000 nm are disclosed in EP-A-1 191 041. Suitable colorants in addition to organic dyes are also UV absorbers and optical brighteners. The dispersions are prepared by miniemulsion polymerization.

DE-A-102 54 548 discloses the use of finely divided polymer powders comprising at least one UV absorber for the stabilization of polymers to the action of UV radiation. The polymer particles of the polymer powders have a particle size of 500 nm or less. They are prepared by miniemulsion polymerization and isolated from the aqueous dispersions.

DE-A-102 48 879 discloses aqueous polymer dispersions which comprise alkyldiketenes and are obtainable by miniemulsion polymerization of hydrophobic monoethylenically unsaturated monomers in the presence of alkyldiketenes. Aqueous polymer dispersions which have a corresponding composition, comprise alkenylsuccinic anhydrides and are prepared by polymerization of hydrophobic monomers by a miniemulsion polymerization method in the presence of alkenylsuccinic anhydrides and, if appropriate, additionally alkyldiketenes are disclosed in WO-A-2005/070912. The dispersions are used in each case as size for paper or as water repellent for leather, natural and/or synthetic fibers and textiles.

A process for the emulsion polymerization of ethylenically unsaturated monomers which comprise at least one dissolved insecticide is disclosed in U.S. Pat. No. 3,400,093. In this process, a solution of a virtually water-insoluble insecticide in at least one water-insoluble vinyl monomer is first emulsified in an aqueous solution comprising at least one surfactant, and this mixture is then subjected to the emulsion polymerization.

According to the process disclosed in EP-A-0 875 544, for example, polymer dispersions comprising UV absorbers can be prepared by dissolving at least one UV absorber in at least one ethylenically unsaturated monomer and then subjecting the solution to an emulsion polymerization in water which comprises a polymerization initiator and an emulsifier. The polymer particles may be composed of a single polymer or may have a core/shell structure, it being possible for the UV absorber to be either in the core or in the shell of the polymer particle or both in the core and in the shell.

WO-A-01/10936 discloses particles having a core/shell structure, in which the core comprises a polymer having a glass transition temperature $T_g$ below 40° C. and a polymerizable UV absorber, and the shell preferably consists of a polymer of methyl acrylate, ethyl acrylate, ethyl methacrylate, and/or methyl methacrylate. The polymer which forms the core of the particle can, if appropriate, be crosslinked. The polymer particles are prepared by emulsion polymerization. The polymer particles comprising a UV absorber are used for the preparation of UV-absorbing polymer compositions.

WO-A-2006/015791 discloses a process for the preparation of aqueous active substance compositions of sparingly water-soluble active substances. The process comprises the following steps:

a) provision of an aqueous suspension of solid active substance particles of at least one active substance having a water solubility of not more than 5 g/l at 25° C./1013 mbar, comprising, for the stabilization of the dispersed active substance particles, at least one surface-active substance, the active substance particles in the suspension having a mean particle size, determined by dynamic light scattering, of not more than 1200 nm, b) emulsion polymerization of a first monomer composition M1 in the aqueous suspension of the active substance, with the monomer composition M1 comprising at least 95% by weight, based on its total weight, of at least one neutral, monoethylenically unsaturated monomer M1.1 having a water solubility of not more than 30 g/l at 25° C./1013 mbar, an aqueous dispersion of polymer-active substance particles being obtained, and c) emulsion polymerization of a second monomer composition M2 in an aqueous dispersion of the polymer-active substance particles obtained in step b), the monomer composition M2 comprising at least 60% by weight, based on its total weight, of at least one neutral, monoethylenically unsaturated monomer M2.1 having a water solubility of not more than 30 g/l at 25° C./1013 mbar.

Active substances are understood as meaning substances which cause a physiological reaction even in low concentration in an organism. They are preferably active substances for crop protection and for material protection, e.g. herbicides, fungicides, insecticides, acaricides, nematicides, bactericides, growth regulators and other biocides.

It is the object of the invention to provide a further process for the preparation of aqueous dispersions comprising water-insoluble active substances.

The object is achieved, according to the invention, by a process for the preparation of aqueous polymer dispersions comprising at least one lipophilic active substance by emulsion polymerization of ethylenically unsaturated monomers in an aqueous medium in the presence of at least one lipophilic active substance if (i) at least one lipophilic active substance which has a water solubility of not more than 5 g/l (determined at 25° C. and 1013 mbar) and a melting point below 130° C. is emulsified in an aqueous solution which comprises at least one dispersion stabilizer with formation of an aqueous dispersion of the active substance having a mean particle size of not more than 1000 nm and (ii) a monomer composition which comprises at least 80% by weight of a neutral, monoethylenically unsaturated monomer emulsifiable in water is subjected to an emulsion polymerization in the aqueous dispersion of the active substance which is obtained according to (i).

A preferred embodiment of the process is one in which (i) at least one lipophilic active substance which has a water solubility of not more than 5 g/l (determined at 25° C. and 1013 mbar) and a melting point below 100° C. is emulsified in an aqueous solution which comprises at least one dispersion stabilizer with formation of an aqueous dispersion of the active substance having a mean particle size of not more than 500 nm and (ii) a monomer composition which comprises at least 80% by weight of a neutral, monoethylenically unsaturated monomer emulsifiable in water is subjected to an emulsion polymerization in the aqueous dispersion of the active substance which is obtained according to (i).

The aqueous dispersion of the lipophilic active substance is particularly advantageously prepared by emulsifying, in step (i), a melt of at least one lipophilic substance in an aqueous solution comprising at least one dispersion stabilizer.

Suitable lipophilic active substances have a melting point or softening range which is below 130° C., preferably below 100° C. In principle, all lipophilic active substances which have a water solubility of not more than 5 g/l (determined at 25° C. and 1013 mbar) and which melt or are present in liquid form below a temperature of 130° C., preferably below 100° C., can be used in process step (i). Examples of such active substances are alkyl- or alkenyldiketenes, alkenylsuccinic anhydrides, rosin size, UV absorbers, antistatic agents, antioxidants, antifogging agents, lubricants, colorants, tackifiers, waxes and crop protection agents. Preferably used active substances are alkyldiketenes, alkenylsuccinic anhydrides and rosin size and UV absorbers.

Suitable alkyldiketenes are preferably $C_{14}$- to $C_{22}$-alkyl- or alkenyldiketenes. They are prepared, for example, from the corresponding acyl chlorides by elimination of hydrogen chloride with tertiary amines. The diketenes which can be used according to the invention may carry saturated or unsaturated, branched or cyclic hydrocarbon radicals. Examples of such alkyldiketenes are tetradecyldiketene, hexadecyldiketene, octadecyldiketene, docosyldiketene, palmityldiketene, oleyldiketene, stearyldiketene and behenyldiketene. Stearyldiketene, palmityldiketene, oleyldiketene, behenyldiketene, isostearyldiketene or mixtures of alkyldiketenes, for example mixtures of behenyldiketene and stearyldiketene or mixtures of stearyldiketene and palmityldiketene, are preferably used.

Alkenylsuccinic anhydrides are described, for example, in U.S. Pat. No. 3,102,064, EP-A-0 609 879 and EP-A-0 593 075. All alkenylsuccinic anhydrides which have been described to date in the literature as engine sizes for paper are also suitable according to the invention as an active substance, either alone or in combination with alkyldiketenes. Suitable alkenylsuccinic anhydrides comprise, in the alkyl group, an alkyl radical having at least 6 carbon atoms, preferably a $C_{14}$- to $C_{24}$-olefin radical. Particularly preferred alkenylsuccinic anhydrides comprise 16 to 22, generally 16 to 18, carbon atoms in the alkenyl group. They may comprise linear, additionally unsaturated or branched alkenyl groups. Alkenylsuccinic anhydrides are obtainable, for example, from α-olefins, which are first isomerized. This gives a mixture of different isomers which is then reacted with maleic anhydride in an ene reaction to give succinic anhydrides. Alkenylsuccinic anhydrides are prepared according to EP-A-0 593 075 by reaction of propylene or n-butylene oligomers with maleic anhydride. Examples of this group of reactive sizes are decenylsuccinic anhydride, dodecenylsuccinic anhydride, octenylsuccinic anhydride and n-hexadecenylsuccinic anhydride. The individual isomeric succinic anhydrides may have a different sizing effect. Thus, for example, 2- and 3-hexadecenylsuccinic anhydride are not as effective as engine sizes as the isomeric 4-, 5-, 6-, 7- and 8-hexadecenylsuccinic anhydrides.

The suitable active substances include rosin size and derivatives derived therefrom, such as, for example, reaction products of rosin size and maleic anhydride. The derivatives may be branched or unsaturated, e.g. abietic acid.

Further suitable active substances are substances to which, polymers are added in order to make them antistatic or protect them from fogging or to stabilize them to oxidation or the action of UV rays, heat and/or light. Such stabilizers are commercial products. Thus, for example, UV absorbers are sold under the trade name Uvinul® by BASF Aktiengesellschaft, Ludwigshafen. The suitable UV absorbers have a water solubility of not more than 5 g/l (determined at 25° C. and 1013 mbar). It is known that UV absorbers are understood as meaning compounds which absorb UV rays and deactivate the absorbed radiation without radiation. UV absorbers absorb light of wavelength <400 nm and convert it into heat radiation. Examples of UV absorbers are derivatives of p-aminobenzoic acid, in particular the esters thereof, e.g. ethyl 4-aminobenzoate, and ethoxylated ethyl 4-aminobenzoates, salicylates, substituted cinnamates, such as octyl p-methoxycinnamate or 4-isopentyl 4-methoxycinnamate, 2-phenylbenzimidazole-5-sulfonic acid and its salts. A particularly preferably used UV absorber is 4-n-octyloxy-2-hydroxybenzophenone. Further examples of UV absorbers are derivatives of benzoxazoles, derivatives of benzotriazoles, benzylidenecamphor, dibenzoylmethanes and 2-(2-hydroxyphenyl)-1,3,5-triazines. UV absorbers are also described in the document Cosmetic Legislation, Vol. 1, Cosmetic Products, European Commission 1999, pages 64-66 and in lines 14 to 30 on page 6 of EP-A 1 191 041, each of which is hereby incorporated by reference.

Other suitable active substances are stabilizers and assistants for organic polymers, in particular thermoplastic polymers. The stabilizers are compounds which stabilize polymers to degradation under the action of oxygen, light or heat. They are also referred to as antioxidants or as UV and light stabilizers, cf. Ullmanns, Encyclopedia of Industrial Chemistry, Vol. 3, 629-650 (ISBN-3-527-30385-5) and EP-A-1 110 999, page 2, line 29 to page 38, line 29. This group of active substances includes flameproofing agents. With such stabilizers, virtually all organic polymers can be stabilized, cf. EP-A-1 110 999, page 38, line 30 to page 41, line 35. These literature references are made part of the disclosure content of the present invention by reference. The stabilizers described in the EP application belong to the class of compounds consisting of the pyrazolones, the organic phosphites or phosphonites, the sterically hindered phenols and the sterically hindered amines (stabilizers of the so-called HALS type, cf. Römpp, 10th Edition, Volume 5, pages 4206-4207).

Assistants for polymers are to be understood as meaning, for example, substances which at least substantially prevent the fogging of films and shaped articles comprising plastics, so-called antifogging agents. Commercially available stabilizers and assistants are sold under the brands Tinuvin® and Cyasorb® by Ciba and Tenox® by Eastman Kodak. Stabilizers and assistants are described, for example, in Plastics Additives Handbook, 5th Edition, Hanser Verlag, ISBN 1-56990-295-X. The assistants also include lubricants for polymers.

All colorants which have a melting point or softening range below 130° C. and a water solubility of not more than 5 g/l (determined at 25° C. and 1013 mbar) can also be used as active substances. Colorants are to be understood as meaning all conventional colorants, optical brighteners, IR dyes and fluorescent dyes. Examples of dyes are to be found, for example, in DE-A-1 99 37 261, page 2, line 31 to page 8, line 27.

Other suitable active substances are tackifiers and waxes. In the context of the present invention, waxes are understood as meaning the following compounds: fats, fatty acids, fatty alcohols and fatty acid esters, in particular glycerides, sterols and sterol esters (squalene), waxes based on paraffin or olefin polymers (copolymers of ethylene and acrylic acid or of ethylene and dimethylaminopropyl methacrylate, maleic anhydride copolymers, such as copolymers of styrene and maleic anhydride (MAA), copolymers of isobutene and MAA, copolymers of diisobutene and MAA, polyisobutylenes).

Further suitable active substances are compositions for material protection and crop protection agents, which in each case fulfill the abovementioned conditions (water solubility and melting point or softening range), e.g. herbicides, fungicides, insecticides, acaricides, nematicides, bactericides and growth regulators. Such active substances are described, for example, in Ullmanns Encyclopedia of Industrial Chemistry, 5th Edition on CD-Rom, Wiley VCH 1997: Chapter on Fungicides, Insect Control and Weed Control, and Compendium of Pesticide common names, http://www.hclrss.demon.co.uk./index.html. According to the invention, elemental sulfur, too, can be used as an active substance.

The suitable lipophilic active substances are dispersed in water in process step (i). They are preferably first melted and then emulsified as a melt in water in the presence of a dispersion stabilizer. The emulsification of the active substances can be effected, for example, by high-pressure emulsification in the apparatuses known for this purpose, with the aid of the action of ultrasound or by the action of strong shear forces, for example, with the aid of an Ultra-Turrax® apparatus.

During the emulsification process, the temperature of the system may be from 0 to 130° C., preferably up to 100° C. In general, the active substances are emulsified in the temperature range from 5 to 95° C. in water which comprises a dispersion stabilizer. If temperatures above 100° C. are used, the emulsification step is effected under superatmospheric pressure in pressure-tight apparatuses. During the emulsification, the temperature should be at least 5° C., preferably at least 10° C., above the melting point or above the beginning of the softening range of the respective active substance. After the emulsification, the resulting oil-in-water emulsion of the lipophilic active substance is cooled, in general to the respective ambient temperature, for example from 10 to 30° C. Step (i) gives either an emulsion, if the melting point of the active substance is above the temperature of the system, or an aqueous dispersion, if the emulsified particles of the active substance are present in the solid state of aggregation.

The mean diameter of the emulsified particles of the active substance is not more than 1000 nm. It is in general in the range of from 20 to 1000 nm, preferably from 30 to 500 nm and in particular from 40 to 200 nm. The particle sizes of the emulsified hydrophilic active substances which are stated here are weight average particle sizes, as can be determined by dynamic light scattering. Methods for this purpose are familiar to the person skilled in the art, for example from H. Wiese in D. Distler, Wässrige Polymerdispersionen, Wiley-VCH 1999, Chapter 4.2.1, page 40 et seq. and literature cited there, and H. Auweter, D. Horn, J. Colloid Interf. Sci. 105 (1985) 399, D. Lilge, D. Horn, Colloid Polym. Sci. 269 (1991) 704 or H. Wiese, D. Horn, J. Chem. Phys. 94 (1991) 6429.

In order to obtain as stable a dispersion or emulsion as possible of the active substance, the step (i) is preferably carried out in the presence of at least one dispersion stabilizer. In general a stabilizer is first dissolved in water and only thereafter is the molten active substance added. However, the stabilizer may be added only during the emulsification or thereafter. The addition of the stabilizer can be carried out continuously, batchwise or all at once. A dispersion which comprises, for example, from 0.01 to 20% by weight, preferably from 0.1 to 10% by weight and generally from 0.2 to 5% by weight of at least one dispersion stabilizer is obtained.

The content of active substance in the aqueous dispersion may be, for example, from 1 to 60% by weight, preferably from 2 to 50% by weight. In general, it is in the range of from 5 to 30% by weight. The weight ratio of active substance to dispersion stabilizer may be varied within a wide range. It is, for example, from 100:1 to 1:2, preferably from 50:1 to 1:1 and generally from 20:1 to 2:1.

For example, at least one cationic, anionic or nonionic surfactant, a protective colloid or a dispersant or mixtures of surfactants and dispersants is or are used as the dispersion stabilizer. Mixtures of two or more dispersion stabilizers are preferred.

Suitable surfactants are, for example, all surface-active compositions. Examples of suitable nonionic surface-active substances are ethoxylated mono-, di- and trialkylphenols (degree of ethoxylation: from 3 to 50, alkyl radical: $C_3$-$C_{12}$) and ethoxylated fatty alcohols (degree of ethoxylation: from 3 to 80; alkyl radical: $C_8$-$C_{36}$). Examples of these are the Lutensol® brands from BASF AG or the Triton® brands from Union Carbide. Particularly preferred are exthoxylated linear fatty alcohols of the general formula

$n$-$C_xH_{2x+1}$—O(CH$_2$CH$_2$O)$_y$—H, where x are integers in the range of from 10 to 24, preferably in the range of from 12 to 20. The variable y is preferably an integer in the range of from 5 to 50, particularly preferably from 8 to 40. Ethoxylated linear fatty alcohols are usually present as a mixture of different exthoxylated fatty alcohols having different degrees of ethoxylation. In the context of the present invention, the variable y is the average value (number average). Suitable nonionic surface-active substances are furthermore copolymers, in particular block copolymers, of ethylene oxide and at least one $C_3$-$C_{10}$-alkylene oxide, e.g. three-block copolymers of the formula

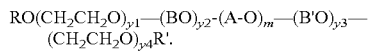

RO(CH$_2$CH$_2$O)$_{y1}$—(BO)$_{y2}$-(A-O)$_m$—(B'O)$_{y3}$— (CH$_2$CH$_2$O)$_{y4}$R'.

where m is 0 or 1, A is a radical derived from an aliphatic, cycloaliphatic or aromatic diol, e.g. ethane-1,2-diyl, propane-1,3-diyl, butane-1,4-diyl, cyclohexane-1,4-diyl, cyclohexane-1,2-diyl or bis(cyclohexyl)methane-4,4'-diyl, B and B', independently of one another, are propane-1,2-diyl, butane-1,2-diyl or phenylethanyl independently of one another are a number from 2 to 100 and Y2, Y3, independently of one another are a number from 2 to 100, the sum y1+y2+y3+y4 preferably being in the range of from 20 to 400, which corresponds to a number average molecular weight in the range from 1000 to 20 000. Preferably, A is ethane-1,2-diyl, propane-1,3-diyl or butane-1,4-diyl. B is preferably propane-1,2-diyl.

In addition to the nonionic surfactants, anionic and cationic surfactants are also suitable as surface-active substances. They can be used alone or as a mixture. A precondition for this, however, is that they are compatible with one another. This precondition applies, for example, to mixtures from one class of compounds in each case and to mixtures of nonionic and anionic surfactants and mixtures of nonionic and cationic surfactants. Examples of suitable surface-active agents are sodium lauryl sulfate, sodium dodecyl sulfate, sodium hexadecyl sulfate and sodium dioctylsulfosuccinate.

Examples of cationic surfactants are quaternary alkylammonium salts, alkylbenzylammonium salts, such as dimethyl-$C_{12}$- to $C_{18}$-alkylbenzylammonium chlorides, primary, secondary and tertiary fatty amine salts, quaternary amidoamine compounds, alkylpyridinium salts, alkylimidazolinium salts and alkyloxazolinium salts.

Particularly preferred are anionic surfactants, such as, for example, (if appropriate alkoxylated) alcohols which are esterified with sulfuric acid and are generally used in a form neutralized with alkali. Further conventional emulsifiers are, for example, sodium alkanesulfonates, sodium alkylsulfates, such as, for example, sodium laurylsulfate, sodium dodecyl-benzenesulfonate or sulfosuccinic esters. Furthermore, esters of phosphoric acid or of phosphorous acid, and aliphatic or aromatic carboxylic acids, can also be used as anionic emulsifiers. Conventional emulsifiers are described in detail in the literature, cf. for example M. Ash, I. Ash, Handbook of Industrial Surfactants, Third Edition, Synapse Information Resources Inc.

Condensates of naphthalenesulfonic acid and formaldehyde, amphiphilic polymers or nanoparticles of water-insoluble organic polymers or of water-insoluble inorganic compounds are also suitable as a dispersion stabilizer (Pickering effect). Stabilizers of this type are, for example, nanoscale silica and alumina.

Amphiphilic polymers having average molar masses $M_w$ of, for example, from 1000 to 100 000 can also be used as a dispersion stabilizer. Examples of amphiphilic polymers are copolymers which comprise units of (a) hydrophobic monoethylenically unsaturated monomers and (b) monoethylenically unsaturated carboxylic acids, monoethylenically unsaturated sulfonic acids, monoethylenically unsaturated phosphonic acids or mixtures thereof and/or basic monomers.

Suitable hydrophobic monoethylenically unsaturated monomers for the preparation of amphiphilic polymers are, for example, styrene, methylstyrene, ethylstyrene, acrylonitrile, methacrylonitrile, $C_2$- to $C_{18}$-olefins, esters of monoethylenically unsaturated $C_3$- to $C_5$-carboxylic acids and monohydric alcohols, vinyl alkyl ethers, vinyl esters or mixtures thereof. From this group of monomers, isobutene, diisobutene, styrene and acrylates, such as ethyl acrylate, isopropyl acrylate, n-butyl acrylate and sec-butyl acrylate are preferably used.

The amphiphilic copolymers preferably comprise, as hydrophilic monomers, (b) acrylic acid, methacrylic acid, maleic acid, maleic anhydride, itaconic acid, vinylsulfonic acid, 2-acrylamidomethylpropanesulfonic acid, acrylamidopropane-3-sulfonic acid, 3-sulfopropyl acrylate, 3-sulfopropyl methacrylate, styrenesulfonic acid, vinylphosphonic acid or mixtures thereof incorporated in the form of polymerized units. The acidic monomers may be present in the form of the free acids or in partially or completely neutralized form.

Further suitable hydrophilic monomers are basic monomers. They can be polymerized with the hydrophobic monomers (a) alone or as a mixture with the abovementioned acidic monomers. If mixtures of basic and acidic monomers are used, amphoteric copolymers form which are anionically or cationically charged depending on the molar ratio of the acidic to basic monomers incorporated in each case in the form of polymerized units.

Basic monomers are, for example, di-$C_1$- to $C_2$-alkylamino-$C_2$- to $C_4$-alkyl (meth)acrylate or diallyldimethylammonium chloride. The basic monomers may be present in the form of the free bases or of the salts with organic or inorganic acids or in the form quaternized with alkyl halides. The salt formation or the quaternization in which the basic monomers become cationic can be effected partially or completely. Examples of such compounds are dimethylaminoethyl methacrylate, diethylaminoethyl methacrylate, dimethylaminoethyl acrylate, diethylaminoethyl acrylate, dimethylaminopropyl methacrylate, dimethylaminopropyl acrylate, diethylaminopropyl methacrylate, diethylaminopropyl acrylate and/or dimethylaminoethylacrylamide, dimethylaminoethylmethacrylamide, dimethylaminopropylacrylamide, dimethylaminopropylmethacrylamide and/or diallyldimethylammonium chloride.

If the amphiphilic copolymers in the form of the free acid are not sufficiently water-soluble, they are used in the form of water-soluble salts, for example the corresponding alkali metal, alkaline earth metal and ammonium salts are used. These salts are prepared, for example, by partial or complete neutralization of the free acid groups of the amphiphilic copolymers with bases; for example, sodium hydroxide solution, potassium hydroxide solution, magnesium oxide, ammonia or amines, such as triethanolamine, ethanolamine, morpholine, triethylamine or butylamine, are used for the neutralization. Preferably, the acid groups of the amphiphilic copolymers are neutralized with ammonia or sodium hydroxide solution. The water solubility of basic monomers or of copolymers which contain such monomers incorporated in the form of polymerized units can no longer be increased by partial or complete neutralization with a mineral acid, such as hydrochloric acid or sulfuric acid, or by addition of an organic acid, such as acetic acid or p-toluenesulfonic acid. The molar mass of the amphiphilic copolymers is, for example, from 1000 to 100 000 and is preferably in the range of from 1500 to 10 000. The acid numbers of the amphiphilic copolymers are, for example, from 50 to 500, preferably from 150 to 350, mg KOH/g of polymer.

Particularly preferred amphiphilic copolymers are those which comprise
from 95 to 45% by weight of isobutene, diisobutene, styrene or mixtures thereof and from 5 to 55% by weight of acrylic acid, methacrylic acid, maleic acid, monoesters of maleic acid or mixtures thereof incorporated in the form of polymerized units.

Copolymers particularly preferably used as a dispersion stabilizer are those which comprise
(a) from 45 to 80% by weight of styrene,
(b) from 55 to 20% by weight of acrylic acid and, if appropriate,
(c) additionally further monomers
incorporated in the form of polymerized units. The copolymers can, if appropriate, comprise units of maleic monoesters as further monomers (c) incorporated in the form of polymerized units. Such copolymers are obtainable, for example, by copolymerizing copolymers of styrene, butadiene or isobutene or mixtures thereof with maleic anhydride in the absence of water and reacting the copolymers with alcohols after the polymerization, from 5 to 50 mol % of a monohydric alcohol being used per mole of anhydride groups in the copolymer. Suitable alcohols are, for example, methanol, ethanol, n-propanol, isopropanol, n-butanol, isobutanol and tert-butanol. However, it is also possible to react the anhydride groups of the copolymers with polyhydric alcohols, such as glycol or glycerol. Here, however, the reaction is continued only until only one OH group of the polyhydric alcohol reacts with the anhydride group. If the anhydride groups of the copolymers are not completely reacted with alcohols, the ring opening of the anhydride groups which have not reacted with alcohol is effected by addition of water.

Other suitable dispersion stabilizers are, for example, commercially available polymers of monoethylenically unsaturated acids and graft polymers of N-vinylformamide on polyalkylene glycols, which are described, for example, in WO-A-96/34903. The grafted-on vinylformamide units can, if appropriate, be hydrolyzed. The proportion of grafted-on vinylformamide units is preferably from 20 to 40% by weight, based on polyalkylene glycol. Polyethylene glycols having molar masses of from 2000 to 10 000 are preferably used.

Zwitterionic polyalkylenepolyamines and zwitterionic polyethylenimines are also suitable as a dispersion stabilizer. Such compounds are disclosed, for example, in EP-B-0 112 592. They are obtainable, for example, by first alkoxylating a polyalkylenepolyamine or polyethylenimine, for example with ethylene oxide, propylene oxide and/or butylene oxide, and then quaternizing the alkoxylation products, for example with methyl bromide or dimethyl sulfate, and then sulfating the quaternized, alkoxylated products with chlorosulfonic acid or sulfur trioxide. The molar mass of the zwitterionic polyalkylenepolyamines is, for example, from 1000 to 9000, preferably from 1500 to 7500. The zwitterionic polyethylenimines preferably have molar masses in the range from 1500 to 7500 dalton.

Further suitable dispersion stabilizers are protective colloids. They have as a rule average molar masses $M_w$ above 500, preferably of more than 1000. Examples of protective colloids are polyvinyl alcohols, cellulose derivatives, such as carboxymethylcellulose, polyvinylpyrrolidone, polyethylene glycols, graft polymers of vinyl acetate and/or vinyl propionate on polyethylene glycols, polyethylene glycols endcapped at one or both ends with alkyl, carboxyl or amino groups, polydiallyidimethylammonium chlorides and/or polysaccharides, such as, in particular, water-soluble starches, starch derivatives and proteins. Such products are described, for example, in Römpp, Chemie Lexikon 9th Edition, Volume 5, page 3569, or in Houben-Weyl, Methoden der organischen Chemie, 4th Edition, Volume 14/2, Chapter IV Umwandlung von Cellulose und Starke by E. Husemann and R. Werner, pages 862-915, and in Ullmanns Encyclopedia for Industrial Chemistry, 6th Edition, Volume 28, page 533 et seq., under Polysaccharides.

Also suitable, for example, are all types of water-soluble starch, for example both amylase and amylopectin, natural starches, hydrophobically or hydrophilically modified starches, anionic starches, cationically modified starches, maltodextrins, degraded starches, it being possible for the starch degradation to be carried out, for example, oxidatively, thermally, hydrolytically or enzymatically, and it being possible for both natural and modified starches to be used for the starch degradation. Further suitable protective colloids are dextrins and crosslinked water-soluble starches which are water-swellable.

Water-soluble starches which, for example, can be converted into a water-soluble form with the aid of a starch digestion and anionically modified starches, such as oxidized potato starch, are preferably used as the protective colloid. Anionically modified starches which were subjected to molecular weight reduction are particularly preferred. The molecular weight reduction is preferably carried out enzymatically. The average molar mass $M_w$ of the degraded starches is, for example, from 500 to 100 000, preferably from 1000 to 30 000. The degraded starches have, for example, an intrinsic viscosity [η] of from 0.04 to 0.5 dl/g. Such starches are described, for example, in EP-B-0 257 412 and in EP-B-0 276 770. If protective colloids are used in the polymerization, the amounts used are, for example, from 0.5 to 50, in particular from 5 to 40, % by weight, generally from 10 to 30% by weight, based on the monomers used in the polymerization.

Of the abovementioned polymeric dispersion stabilizers, preferably at least one protective colloid from the group consisting of the polyvinyl alcohols, polyvinylpyrrolidones, polyacrylic acid, polyalkylene glycols, polyalkylene glycols endcapped at one or both ends with alkyl, carboxyl or amino groups, polydiallyldimethylammonium chlorides, water-soluble starches, water-soluble starch derivatives and water-soluble proteins is preferably used. Particularly preferred dispersion stabilizers are degraded natural starches, cationic starches, mixtures of cationic starch and a surfactant and mixtures of a surfactant and at least one dispersant comprising a condensate of naphthalenesulfonic acid and formaldehyde and/or at least one of the abovementioned protective colloids. The condensates of naphthalenesulfonic acid and formaldehyde can, if appropriate, also be modified by incorporation of urea by condensation. Particularly preferred dispersion stabilizers are mixtures of an anionic surfactant and at least one dispersant comprising a condensate of naphthalenesulfonic acid and formaldehyde or at least one protective colloid.

In step (ii) of the process according to the invention, a monomer composition which comprises at least 80% by weight of a neutral monoethylenically unsaturated monomer emulsifiable in water is subjected to an emulsion polymerization in the aqueous dispersion of the active substance which is obtained after step (i). "Monomers which are emulsifiable in water" is to be understood as meaning those monomers which do not completely dissolve in water and form an emulsion together with water. These monomers have, for example, a water solubility of not more than 90 g/l, preferably not more than 60 g/l (determined in each case at 25° C. and 1013 mbar). In particular, the water solubility of these monomers under the stated conditions is from 0.01 to 40 g/l and especially from 0.1 to 30 g/l.

For stabilizing the subsequent emulsion polymerization, the abovementioned stabilization systems (surfactants and dispersants, water-soluble or water-dispersible polymers and starches) can also be used. They can be initially taken or can be added separately or together to the reaction mixture with the monomers.

The monomer composition comprises (a) at least 80% by weight, based on the total amount of the monomers, preferably at least 95% by weight and in particular at least 99.9% by weight of neutral, monoethylenically unsaturated monomers which are emulsifiable in water. Suitable monomers are, for example, vinylaromatic monomers, such as styrene, α-methylstyrene, tert-butylstyrene and vinyltoluene, esters of α,β-monoethylenically unsaturated mono- and dicarboxylic acids having 3 to 8 and in particular 3 of 4 carbon atoms with $C_1$-$C_{18}$-alkanols or with $C_5$-$C_8$-cycloalkanols, in particular the esters of acrylic acid, of methacrylic acid, of crotonic acid, the diesters of maleic acid, of fumaric acid and of itaconic acid and particularly preferably the esters of acrylic acid with $C_1$- to $C_{10}$-alkanols (=$C_1$- to —$C_{10}$-alkyl acrylates) such as ethyl acrylate, n-butyl acrylate, isobutyl acrylate, tert-butyl acrylate, n-hexyl acrylate, 2-ethylhexyl acrylate and 3-propylheptyl acrylate and the esters of methacrylic acid with $C_1$- to $C_{10}$-alkanols, such as ethyl methacrylate, n-butyl methacrylate, isobutyl methacrylate, tert-butyl methacrylate, n-hexyl methacrylate and the like. Suitable monomers of this type are moreover vinyl and allyl esters of saturated aliphatic carboxylic acids having 1 to 18 carbon atoms, for example vinyl acetate, vinyl propionate, and the vinyl esters of Versatic® acids (vinyl versatates), vinyl halides, such as vinyl chloride and vinylidene chloride, and $C_2$-$C_6$-olefins, such as ethylene, propene, 1-butene and n-hexene. Preferred monomers are vinylaromatic monomers, $C_2$-$C_{18}$-alkyl acrylates, in particular $C_2$-$C_8$-alkyl acrylates, especially tert-butyl acrylate, and $C_2$-$C_{18}$-alkyl methacrylates and in particular $C_2$-$C_4$-alkyl methacrylates.

In particular, at least 70% by weight of the monomer composition of group (a) which is used in the emulsion polymerization are selected from vinylaromatic monomers, in particular styrene, esters of methacrylic acid with $C_2$-$C_4$-alkanols and tert-butyl acrylate. Particularly preferred monomers of this type are vinylaromatic monomers, especially styrene, and mixtures of vinylaromatic monomers with the abovementioned $C_2$-$C_8$-alkyl acrylates and/or $C_2$-$C_4$-alkyl methacrylates, in particular those mixtures having a proportion of vinylaromatics of at least 60% by weight, based on the total amount of the monomers.

The monomer composition can moreover comprise up to 20% by weight, based on the total weight of the monomers, of one or more monoethylenically unsaturated monomers (b) differing from the monomers of group (a). Preferably, the proportion of the monomers (b) accounts for 15% by weight, in particular up to 5% by weight, based on the total amount of the monomers. However, the monomers (b) are used only in amounts such that the resulting polymers are insoluble in water so that dispersions are always obtained.

The monomers (b) include in particular monoethylenically unsaturated monomers which have at least one acid group, such as a sulfo group, a phosphonic acid or one or two carboxyl groups and the salts of these monomers, in particular the alkali metal salts, e.g. the sodium or potassium salts, and the ammonium salts. This group of monomers (b) includes ethylenically unsaturated sulfonic acids, in particular vinylsulfonic acid, 2-acrylamido-2-methylpropanesulfonic acid, 2-acryloyloxyethanesulfonic acid, 2-methacryloyloxyethanesulfonic acid, 3-acryloyloxy- and 3-methacryloyloxypropanesulfonic acid, vinylbenzenesulfonic acid and salts thereof, ethylenically unsaturated phosphonic acids, such as vinylphosphonic acid and dimethyl vinylphosphonate and salts thereof, and α,β-ethylenically unsaturated $C_3$-$C_8$-mono- and $C_4$-$C_8$-dicarboxylic acids, in particular acrylic acid, methacrylic acid, crotonic acid, maleic acid, fumaric acid and itaconic acid. The proportion of the monomers having acid groups will frequently account for not more than 20% by weight, preferably not more than 15% by weight, e.g. from 0.1 to 15% by weight and in particular from 0.5 to 10% by weight, based on the total amount of the monomers.

The monomers of group (b) furthermore include monoethylenically unsaturated, neutral monomers, such as the amides of the abovementioned ethylenically unsaturated carboxylic acids, in particular acrylamide and methacrylamide, hydroxyalkyl esters of the abovementioned α,β-ethylenically unsaturated $C_3$-$C_8$-monocarboxylic acids and of the $C_4$-$C_8$-dicarboxylic acids, in particular 2-hydroxyethyl acrylate, 2-hydroxyethyl methacrylate, 2- and 3-hydroxypropyl acrylate, 2- and 3-hydroxypropyl methacrylate, esters of the abovementioned monoethylenically unsaturated mono- and dicarboxylic acids with $C_2$-$C_4$-polyalkylene glycols, in particular the esters of these carboxylic acids with polyethylene glycol or alkylpolyethylene glycols, the (alkyl)polyethylene glycol radical usually having a molecular weight in the range of from 100 to 3000. The monomers (b) furthermore include N-vinylamides, such as N-vinylformamide, N-vinylpyrrolidone, N-vinylimidazole and N-vinylcaprolactam. The proportion of these monomers is chosen so that the resulting polymers are insoluble in water. It is preferably not more than 20% by weight and in particular not more than 10% by weight, e.g. from 0.1 to 10 and in particular from 0.5 to 5% by weight, based on the total amount of the monomers.

The monomers of the group (b) furthermore include monoethylenically unsaturated monomers which have at least one cationic group and/or at least one amino group protonatable in an aqueous medium, a quaternary ammonium group, a protonatable imino group or a quaternized imino group. Examples of monomers having a protonatable imino group are N-vinylimidazole and N-vinylpyridines. Examples of monomers having a quaternized imino group are N-alkylvinylpyridinium salt and N-alkyl-N'-vinylimidazolinium salts, such as N-methyl-N'-vinylimidazolinium chloride or metosulfate. Particularly preferred among these monomers are the monomers of the general formula I
where
$R^1$ is hydrogen or $C_1$-$C_4$-alkyl, in particular hydrogen or methyl,
$R^2$, $R^3$ independently of one another, are $C_1$-$C_4$-alkyl, in particular methyl, and
$R^4$ is hydrogen or $C_1$-$C_4$-alkyl, in particular hydrogen or methyl,
Y is oxygen, NH or $NR^5$ where $R^5$=$C_1$-$C_4$-alkyl,
A is $C_2$-$C_8$-alkylene, e.g. 1,2-ethanediyl, 1,2- or 1,3-propanediyl, 1,4-butanediyl or 2-methyl-1,2-propanediyl, which, if appropriate, is interrupted by 1, 2 or 3 non-neighboring oxygen atoms, and
$X^-$ is one anion equivalent, e.g. is $Cl^-$, $HSO_4^-$, ½ $SO_4^{2-}$ or $CH_3OSO_3^-$, etc.,
and for Y=H the free bases of the monomers of the formula I.

Examples of such monomers are 2-(N,N-dimethylamino)ethyl acrylate, 2-(N,N-dimethylamino)ethyl methacrylate, 2-(N,N-dimethylamino)ethylacrylamide, 3-(N,N-dimethylamino)propylacrylamide, 3-(N,N-dimethylamino)propylmethacrylamide, 2-(N,N-dimethylamino)ethylmethacrylamide, 2-(N,N,N-trimethylammonium)ethyl acrylate chloride, 2-(N,N,N-trimethylammonium)ethyl methacrylate chloride, 2-(N,N,N-trimethylammonium)ethylmethacrylamide chloride, 3-(N,N,N-trimethylammonium)propylacrylamide chloride, 3-(N,N,N-trimethylammonium)propylmethacrylamide chloride, 2-(N,N,N-trimethylammonium)ethylacrylamide chloride, and the corresponding metosulfates and sulfates.

In a further embodiment, the monomers (b) forming the polymer comprise at least one cationic monomer. The proportion of the cationic monomers is then advantageously from 0.1 to 20% by weight, in particular from 0.5 to 10% by weight, and particularly preferably from 1 to 7% by weight, based on the total amount of the monomers.

The polymers can, if appropriate, comprise a further group of monomers (c) which are incorporated in the form of polymerized units and can usually be used as crosslinking agents in an emulsion polymerization. However, the proportion of monomers (c) which have two or more ethylenically unsaturated double bonds usually accounts for not more than 10% by weight, in general not more than 5% by weight, in particular not more than 2% by weight, e.g. from 0.01 to 2% by weight and in particular from 0.05 to 1.5% by weight, based on the total amount of the monomers. Examples of crosslinking agents are butanediol diacrylate, butandiol dimethacrylate, hexanediol diacrylate, hexanediol dimethacrylate, glycol diacrylate, glycol dimethacrylate, trimethylolpropane triacrylate, trimethylolpropane trimethacrylate, pentaerythrityl triacrylate, pentaerythrityl tetraacrylate, diacrylates and dimethacrylates of alkoxylated dihydric alcohols, divinylurea and/or conjugated diolefins, such as butadiene or isoprene.

Depending on the intended use, the monomers of group (c) may also comprise so-called functional monomers, i.e. monomers which, in addition to a polymerizable C=C-double bond, also have a reactive functional group, for example an oxirane group, a reactive carbonyl group, e.g. an acetoacetyl group, an isocyanate group, an N-hydroxymethyl group, an N-alkoxymethyl group, a trialkylsilyl group a trialkoxysilyl group or another group reactive toward nucleophiles.

Furthermore, it has proven advantageous if the monomer composition is chosen so that the resulting polymer has a glass transition temperature of at least 0, preferably at least 110° C., in particular in the range of from 20 to 130° C.

In order to prepare polymers having such a glass transition temperature, for example, the monomers (a) in the monomer mixture are chosen so that they correspond to polymer 1 having a theoretical glass transition temperature according to Fox, $T_g$ (Fox), of at least 50° C. According to Fox (T. G. Fox, Bull. Am. Phys. Soc. (Ser. II) 1, 123 [1956] and Ullmanns Enzyklopädie der technischen Chemie, Weinheim (1980), pages 17-18) a good approximation for the glass transition temperature of uncrosslinked or weakly crosslinked copolymers at high molar masses is $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions of the monomers $1, 2, \ldots, n$ and $T_g^1, T_g^2, T_g^n$ are the glass transition temperatures of the polymers composed in each case of only one of the monomers $1, 2, \ldots, n$, in degrees Kelvin. The latter are known, for example, from Ullmann's Encyclopedia of Industrial Chemistry, VCH, Weinheim, Vol. A 21 (1992) page 169 or from J. Brandrup, E. H. Immergut, Polymer Handbook 3rd ed., J. Wiley, New York 1989.

Incidentally, the glass transition temperature $T_g$ is understood as meaning the "midpoint temperature" determined according to ASTM D 3418-82 by differential thermal analysis (DSC) (cf. Ullmann's Encyclopedia of Industrial Chemistry, 5th Edition, Volume A 21, VCH Weinheim 1992, page 169, and Zosel, Farbe und Lack 82 (1976), pages 125-134, also see DIN 53765).

The polymerization of the monomers is effected by an emulsion polymerization method, i.e. the monomers to be polymerized are present in the polymerization mixture as an aqueous emulsion. For this purpose, they can be added as such or in the form of an aqueous emulsion to the dispersion of the active substance prepared in step (i). The monomers are preferably used in the form of an aqueous emulsion. The compounds used for stabilizing the monomer emulsions are the same as those which are used as a dispersion stabilizer in process step (i) for the preparation of the aqueous dispersions of active substances, e.g. anionic surfactants, water-soluble starch, preferably anionic starch, and protective colloids.

The monomers can be initially taken in the reactor before the beginning of the polymerization or can be added under polymerization conditions in one or more portions or continuously to the aqueous dispersion of at least one active substance prepared in step (i). For example, the main amount of the monomers, in particular at least 80% and particularly preferably the total amount, can be initially taken in the polymerization vessel together with the dispersion of the active substance according to (i) and the polymerization can be initiated directly thereafter by addition of a polymerization initiator. According to another process variant, the aqueous dispersion of at least one active substance, prepared in process step (i), is initially taken in the polymerization reactor, at least 50%, preferably 100%, of the monomers in the form of an aqueous emulsion are then metered, the reactants are thoroughly mixed continuously and at least one polymerization initiator is metered only after a residence time of from 1 to 120 minutes, preferably from 5 to 60 minutes, after addition of the monomer emulsion, and the monomers are polymerized. During the thorough mixing (before addition of the polymerization initiator), the reaction mixture is preferably heated to the polymerization temperature.

A further process variant consists in initially taking a part (e.g. from 10 to 25%) of the aqueous dispersion of the active substance prepared according to process step (i) and a part (e.g. from 5 to 25%) of the monomers or the monomer emulsion in the polymerization reactor, initiating the polymerization by addition of an initiator and adding the remaining aqueous dispersion of the active substance and the remaining amount of monomers or monomer emulsion to the reactor continuously or in portions and completing the polymerization of the monomers. In this process variant, the polymerization initiator can, for example, be partly or completely initially taken together with the dispersion of the active substance or can be metered into the reactor separately from the metering of the dispersion of the active substance and of the monomers.

The initiators suitable for the emulsion polymerization in step (ii) are in principle all customarily used polymerization initiators which are suitable for an emulsion polymerization and trigger a free radical polymerization of ethylenically unsaturated monomers. These include, for example, azo compounds, such as 2,2'-aszobisisobutyronitrile, 2,2'-azobis(2-methylbutyronitrile), 2,2'-azobis[2-methyl-N-(-2-hydroxyethyl)propionamide, 1,1'-azobis(1-cyclohexanecarbonitrile), 2,2'-azobis(2,4-dimethylvaleronitrile), 2,2'-azobis(N,N'-dimethyleneisobutyroamidine) dihydrochloride, and 2,2'-azobis(2-amidinopropane) dihydrochloride, organic or inorganic peroxides, such as diacetyl peroxide, di-tert-butyl peroxide, diamyl peroxide, dioctanoyl peroxide, didecanoyl peroxide, dilauroyl peroxide, dibenzoyl peroxide, bis(o-toluoyl)peroxide, succinyl peroxide, tert-butyl peracetate, tert-butyl permaleate, tert-butyl perisobutyrate, tert-butyl perpivalate, tert-butyl peroctanoate, tert-butyl perneodecanoate, tert-butyl perbenzoate, tert-butyl peroxide, tert-butyl hydroperoxide, cumyl hydroperoxide, tert-butyl peroxy-2-ethylhexanoate and diisopropyl peroxydicarbamate, salts of peroxodisulfuric acid and redox initiator systems.

A redox initiator system, in particular a redox initiator system which comprises a salt of peroxodisulfuric acid, hydrogen peroxide or an organic peroxide, such as tert-butyl hydroperoxide as the oxidizing agent, is preferably used for the polymerization in step (ii). As the reducing agent, the redox initiator systems preferably comprise a sulfur compound which is selected in particular from sodium hydrogen sulfite, sodium hydroxymethanesulfinate and the hydrogen sulfite adduct with acetone. Further suitable reducing agents are phosphorus-containing compounds, such as phosphorous acid, hypophosphites and phosphinates, and hydrazine and hydrazine hydrate and ascorbic acid. Furthermore, redox initiator systems may comprise an addition of small amounts of redox metal salts, such as iron salts, vanadium salts, copper salts, chromium salts or manganese salts, such as, for example, the redox initiator system ascorbic acid/iron(II) sulfate/sodium peroxodisulfate. Particularly preferred redox initiator systems are acetone/bisulfite adduct/organic hydroperoxide, such as tert-butyl hydroperoxide; sodium disulfite ($Na_2S_2O_5$)/organic hydroperoxide, such as tert-butyl hydroperoxide; sodium hydroxymethanesulfinate/organic hydroperoxide such as tert-butyl hydroperoxide; and ascorbic acid/hydrogen peroxide.

Usually, the initiator is used in an amount of from 0.02 to 2% by weight and in particular from 0.05 to 1.5% by weight, based on the amount of the monomers. The optimum amount of initiator does of course depend on the initiator system used and can be determined by the person skilled in the art in routine experiments. The initiator can be partly or completely initially taken in the reaction vessel. In general, a part of the amount of initiator is initially taken together with a part of the monomer emulsion and the remaining initiator is added continuously or batchwise together with the monomers but separately therefrom.

Pressure and temperature are of minor importance for carrying out the polymerization of the monomers. The temperature does of course depend on the initiator system used. The optimum polymerization temperature can be determined by the person skilled in the art with the aid of routine experiments. Usually, the polymerization temperature is in the range of from 0 to 110° C., frequently in the range of from 30 to 95° C. The polymerization is usually carried out at atmospheric pressure or ambient pressure. However, it can also be carried out at superatmospheric pressure, e.g. up to 10 bar, or at reduced pressure, e.g. at from 20 to 900 mbar, but in general at >800 mbar. The duration of the polymerization in step (ii) is preferably from 1 to 120 minutes, in particular from 2 to 90 minutes and particularly preferably from 3 to 60 minutes. Longer or shorter polymerization times also being possible.

The polymerization in step (ii) is preferably effected under so-called "starved conditions", i.e. conditions which as far as possible permit only little or no formation of empty micelles and hence the formation of polymer particles free of active substance. For this purpose, either no further surface-active substance is added or only so little further surface-active substance is added that the active substance particles are wetted by the water-insoluble monomers and are stabilized in the aqueous phase. Thus, it is ensured that no measurable proportions of stabilized droplets of monomers are present in the reaction mixture in which a polymerization can take place, and the surface-active substances present in the polymerization mixture serve substantially for wetting the surface of the active substance particles and for transporting the monomers (a) through the continuous aqueous phase.

If a further dispersion stabilizer is added in step (ii) for stabilizing the resulting emulsion polymers, at least one further surface-active substance is preferably metered in an amount of, for example, up to 5% by weight, e.g. from 0.1 to 5% by weight, based on the monomers to be polymerized. Suitable further surface-active substances in addition to the nonionic surface-active substances are in particular anionic emulsifiers, e.g. alkyl sulfates, alkane sulfonates, alkylaryl sulfonates, alkyl ether sulfates, alkylaryl ether sulfates, anionic starch, sulfosuccinates, such as sulfosuccinic monoesters and sulfosuccinic diesters, and alkyl ether phosphates, and furthermore cationic emulsifiers, which are also used in step (i).

In a preferred embodiment of the invention the emulsion polymerization of the monomers is carried out in the presence of the dispersion of an active substance prepared in step (i), and, for example, up to 20% by weight, in general up to 10% by weight, based on the total dispersion, of a cationically or anionically modified starch is also added.

Of course, further additives which are customary in emulsion polymerization, for example glycols, polyethylene glycols, buffer/pH regulators, molecular weight regulators and chain transfer inhibitors, can be added to the polymerization mixture in step (ii).

In order to modify the properties of the polymers, the emulsion polymerization can, if appropriate, be carried out in the presence of at least one polymerization regulator. Examples of polymerization regulators are organic compounds which comprise sulfur in bound form, such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea, aldehydes, such as formaldehyde, acetaldehyde and propionaldehyde, organic acids, such as formic acid, sodium formate or ammonium formate, alcohols, such as, in particular, isopropanol, and phosphorus compounds such as sodium hypophosphite. If a regulator is used in the polymerization, the amount used in each case is, for example, from 0.01 to 5, preferably from 0.1 to 1, % by weight, based on the monomers used in the polymerization. Polymerization regulators and crosslinking agents can be used together in the polymerization. For example, the rheology of the resulting polymer dispersions can be controlled therewith.

After step (ii), an aqueous polymer/active substance dispersion is obtained, the active substance particles of the originally provided active substance suspension being at least partly coated with the water-insoluble polymer formed from the monomers. No measurable proportions or only extremely small proportions of agglomerates are observed, which as a rule account for less than 2% by weight, preferably less than 0.2% by weight, based on the solids present in the dispersion.

In a further step, the aqueous polymer dispersions which are obtainable according to (ii) and comprise at least one type of active substance particles can be subjected to an additional emulsion polymerization, if appropriate in a further process step (ii), in order to vary the properties of the polymer particles. Another monomer or another mixture of monomers can be polymerized onto the dispersed polymer particles thereby so that particles having a core/shell structure form. The shell of such structures may be uncrosslinked or preferably crosslinked. For the emulsion polymerization in step (iii), all information given for the emulsion polymerization in step (ii) is applicable. If step (iii) is carried out, for example, the weight ratio of polymer in the core to polymer in the shell is from 10:1 to 1:5, preferably from 5:1 to 1:1.

In process step (ii) the monomers are preferably used in an amount such that the weight ratio of active substance to monomers is in the range of from 10:1 to 1:50, in particular from 5:1 to 1:30 and particularly preferably in the range of from 2:1 to 1:20. However, the aqueous dispersions prepared by the process according to the invention and comprising active substances can, if appropriate, be subjected to purification operations, such as filtration. Furthermore, it is possible to isolate the dispersed particles comprising at least one active substance from the dispersion, for example by spray drying. The aqueous dispersions prepared by the process according to the invention and comprising at least one active substance, or the polymer powders preparable therefrom, for example by spray drying, and comprising at least one active substance, can be used directly for the application which is predetermined on the basis of the active substance present in each case therein. They are used, for example, as size for paper, board and cardboard, for the treatment and the stabilization of thermoplastic polymers, for material protection and for crop protection.

Thus, for example, aqueous dispersions comprising alkyldiketene or alkenylsuccinic anhydride as active substance as well as aqueous dispersions comprising rosin size are size for paper, board and cardboard. They can be used both as surface size and as engine size in the amounts customary in each case for the known active substances. Use as a surface size is preferred. In particular, dispersions which comprise at least one alkyldiketene as active substance are used as surface size for paper, board and cardboard.

The dispersions prepared according to the invention can be processed by all methods suitable in the case of surface sizing. The polymer dispersions can be applied, for example, with a size press, a film press or a gate-roll applicator to the surface of the paper to be sized. For the application, the dispersion is usually added to the size press liquor in an amount of from 0.05 to 3% by weight, based on solid substance, and depends on the desired degree of sizing of the papers to be treated. Moreover, the size press liquor may comprise further substances, such as, for example, starch, pigments, optical brighteners, biocides, strength agents for paper, fixing agents, antifoams, retention aids and/or drainage aids. The amounts of polymer which are applied to the surface of paper products are, for example, from 0.005 to 1.0 g/m$^2$, preferably from 0.01 to 0.5 g/m$^2$.

Dispersions which comprise at least one UV absorber as active substance, or the polymer powders obtainable from the aqueous dispersions by spray drying, are used for the stabilization of thermoplastic polymers to the action of UV radiation. They are incorporated, for example, into thermoplastic polymers, such as polyethylene, polypropylene, polyamide, polyacrylonitrile, polycarbonate, polyvinyl chloride or polyester. For example, amounts of from 0.1 to 3, preferably from 0.5 to 2, % by weight of polymers comprising at least one UV absorber are required for this purpose. In order to stabilize a thermoplastic polymer to UV action, for example, it is possible to adopt a procedure in which the polymer is first melted in an extruder and an aqueous dispersion which is prepared by the process according to the invention and to whose polymer particles at least one UV absorber adheres, or a polymer powder which is obtainable, for example by spray drying, from the aqueous dispersion, is incorporated into the melt of a thermoplastic polymer. The finely divided polymer comprising at least one UV absorber is distributed uniformly in the melt of the thermoplastic. The mixture is generally processed to give granules, from which, for example, films which are protected from the reaction of UV radiation are then produced.

The stated percentages in the examples are percentages by weight, unless otherwise evident from the context. The particle sizes were determined by means of a high performance particle sizer (HPPS) from Malvern using an He—Ne-laser (633 nm) at a scattering angle of 173°.

EXAMPLE 1

(i) Dispersing

Stearyldiketene Dispersion A 120 g of stearyldiketene, 871.3 g of demineralized water, 12 g of sodium dodecylsulfonate and 7.6 g of a condensate of naphthalenesulfonic acid and formaldehyde (Tamol® NNP) were mixed and were heated to a temperature of 85° C. As soon as this temperature had been reached, the mixture was pre-emulsified with the aid of an UltraTurrax® apparatus at 6000 rpm in the course of 5 minutes and then emulsified at 80° C. three times with a homogenizer (APV Gaulin LAB 40, 600 bar) and rapidly cooled to room temperature. A finely divided, aqueous dispersion of stearyldiketene having a mean particle size distribution of 144 nm was obtained.

(ii) Emulsion Polymerization 430 g of the stearyldiketene dispersion A described above were initially taken in a two liter reactor equipped with an anchor stirrer and an apparatus for working under an inert gas atmosphere and were heated to a temperature of 85° C., and 0.75 g of a 10% strength aqueous solution of iron(II) sulfate heptahydrate was added. At this temperature, 34.53 g of an 18% strength aqueous hydrogen peroxide solution and 167.26 g of a mixture of 33.93 g of demineralized water, 0.14 g of emulsifier K 30 (40% strength aqueous solution of a mixture of the sodium salts of alkanesulfonates having an average chain length of $C_{15}$), 93.24 g of styrene and 39.96 g of n-butyl acrylate were metered into the reactor in two separate feeds over a period of 120 minutes. Thereafter, the mixture was stirred for a further 90 minutes at 85° C. and cooled to 50° C., 9.25 g of tert-butyl hydroperoxide were added and the mixture was stirred for 15 minutes at 50° C. After cooling to room temperature (20° C.), a finely divided dispersion having a mean particle size distribution of 157 nm and a solids content of 29.6% was obtained.

(iii) Emulsion Polymerization 0.67 g of calcium acetate hydrate (25% in water), 52.96 g of an oxidized potato starch and 0.21 g of an α-amylase (1% in water) were mixed with 108.36 g of demineralized water in a two liter reactor equipped with an anchor stirrer and an apparatus for working under an inert gas atmosphere. The mixture was heated to 85° C. with stirring and a further 1.89 g of the α-amylase were added. After 30 minutes, the enzymatic degradation was stopped with 2.8 g of glacial acetic acid, and 0.56 g of iron(II) sulfate heptahydrate and 326 g of the stearyldiketene dispersion described under (i) were added.

26.13 g of an 18% strength aqueous hydrogen peroxide solution and 134.02 g of a mixture of 33.12 g of demineralized water, 0.10 g of emulsifier K 30 (40% strength aqueous solution of a mixture of the sodium salts of alkanesulfonates having an average chain length of $C_{15}$), 70.56 g of styrene and 30.24 g of n-butyl acrylate were metered into the reactor in two separate feeds over a period of 120 minutes. Thereafter, the mixture was stirred for a further 90 minutes at 85° C. and cooled to 50° C., 9.25 g of tert-butyl hydroperoxide were added and the mixture was stirred for 15 minutes at 50° C. After cooling to room temperature (20° C.) a finely divided dispersion having a mean particle size distribution of 131 nm and a solids content of 26.5% was obtained.

EXAMPLE 2

(i) Preparation of an Aqueous Dispersion of a UV Absorber (Uvinul® 3008)

5.18 parts of 4-n-octoyloxy-2-hydroxybenzophenone (Uvinul® 3008) were added to a solution at 60° C. of 0.86 part of Dowfax® 2A1 (30% strength aqueous solution) in 37.1 parts of water and emulsified by means of a Dr. Hielscher ultrasound sonotrode UP 400S for 120 minutes. After cooling in an ice bath, an aqueous dispersion of the UV absorber having a mean particle size distribution of 282 nm was obtained. The dispersion still had a low viscosity even after storage for several days at room temperature.

(ii) Emulsion Polymerization 431.9 g of the dispersion of a UV absorber obtained according to (i) were initially taken in a 2 l reactor and brought to an internal temperature of 85° C. At this temperature, a solution of 0.74 part of iron(II) sulfate heptahydrate as a 10% strength aqueous solution (addition 1) was then first added. Thereafter, 34.53 parts of 18% strength hydrogen peroxide and a stirred mixture of 23.93 parts of demineralized water, 0.14 part of emulsifier K 30 (40% strength aqueous solution of an anionic surfactant), 93.2 g of styrene and 40 g of n-butyl acrylate were metered simultaneously into the reactor in the course of 120 minutes. After the end of the feed the reaction mixture was polymerized for a further 30 minutes. For deodorizing the batch, 9.25 g of tert-butyl hydroperoxide as a 10% strength aqueous solution were then added and the reaction mixture was stirred for a further 15 minutes at 85° C. After the end of the deodorization, the mixture was allowed to cool to room temperature. The solids content of the dispersion was 26.5%. Thereafter, the dispersion was cooled to room temperature and the dispersion was filtered over a 500 μm filter and then over a 125 μm filter in order to remove the coagulum. The amount of coagulum separated off was 10 g. The mean particle size of the dispersed particles was 514 nm.

EXAMPLE 3

(i) Dispersing

Stearyldiketene Dispersion B 300 g of stearyldiketene, 700 g of demineralized water, 18.2 g of a $C_{13}$-oxo alcohol having a degree of ethoxylation of 10 and 21.4 g of a condensate of naphthalenesulfonic acid and formaldehyde (Tamol® NNP) were mixed and were heated to a temperature of 85° C. As soon as this temperature had been reached, the mixture was pre-emulsified with the aid of an UltraTurrax® apparatus at 6000 rpm in the course of 5 minutes. The mixture was then emulsified at 80° C. three times with a homogenizer (APV Gaulin LAB 40, 600 bar) and cooled rapidly to room temperature. A finely divided aqueous dispersion of stearyldiketene having a mean particle size distribution of 167 nm and a solids content of 31.9% was obtained.

(ii) Emulsion Polymerization 0.67 g of calcium acetate hydrate (25% in water), 52.96 g of a cationized potato starch (DS value=0.048, solids content=90%) and 0.21 g of an α-amylase (1% in water) were mixed with 108.36 g of demineralized water in a two liter reactor equipped with an anchor stirrer and an apparatus for working under an inert gas atmosphere. The mixture was heated to 85° C. with stirring and a further 1.89 g of the α-amylase were added. After 30 minutes, the enzymatic degradation was stopped with 2.8 g of glacial acetic acid, and 0.56 g of iron(II) sulfate heptahydrate and 326 g of the stearyldiketene dispersion B described under (i) were added.

26.13 g of an 18% strength aqueous hydrogen peroxide solution and a mixture of 33.12 g of demineralized water, 0.10 g of emulsifier K 30 (40% strength aqueous solution of a mixture of the sodium salts of alkanesulfonates having an average chain length of $C_{15}$), 70.56 g of styrene and 30.24 g of n-butyl acrylate were metered into the reactor in two separate feeds over a period of 120 minutes. Thereafter, the mixture was stirred for a further 90 minutes at 85° C. and cooled to 50° C., 9.25 g of tert-butyl hydroperoxide were added and the mixture was stirred for 15 minutes at 50° C. After cooling to room temperature (20° C.), a finely divided dispersion having a mean particle size distribution of 143 nm and a solids content of 26.5% was obtained.

EXAMPLE 4

(i) Dispersing

Stearyldiketene Dispersion C 200 g of stearyldiketene, 800 g of demineralized water, 60.4 g of an oleylamine ethoxylate (Lipamin® OK, solids content 40%) and 68.5 g of a maltodextrin starch (average molar mass Mw about 10 000 Da) were mixed and were heated to a temperature of 85° C. After this temperature had been reached, the mixture was pre-emulsified with the aid of an UltraTurrax® apparatus at 6000 rpm in the course of 5 minutes, then emulsified at a temperature of 80° C. three times with a homogenizer (APV Gaulin LAB 40, 600 bar) and rapidly cooled to room temperature. A finely divided aqueous dispersion of stearyldiketene having a mean particle size of 185 nm and a solids content of 24.1% was obtained.

(ii) Emulsion Polymerization 0.67 g of calcium acetate hydrate (25% in water), 52.96 g of cationized corn starch (DS value=0.045, solids content=78%) and 0.21 g of an α-amylase (1% in water) were mixed with 108.36 g of demineralized water in a two liter reactor equipped with an anchor stirrer and an apparatus for working under an inert gas atmosphere. The mixture was heated to 85° C. with stirring and a further 1.89 g of the α-amylase were added. After 30 minutes, the enzymatic degradation was stopped with 2.8 g of glacial acetic acid, and 0.56 g of iron(II) sulfate heptahydrate and 195 g of the stearyldiketene dispersion C were added. Thereafter, 26.13 g of an 18% strength hydrogen peroxide solution were metered in over a period of 120 min. At the same time, a monomer feed consisting of 33.1 g of demineralized water, 0.32 g of emulsifier K 30 (40% strength aqueous solution of a mixture of the sodium salts of alkanesulfonates having an average chain length of $C_{15}$), 1.0 g of tert-dodecyl mercaptan, 63 g of styrene, 12.6 g of 2-ethylhexyl acrylate and 25.2 g of tert-butyl acrylate was started and likewise metered in over 120 min. The mixture was postpolymerized for 30 min and then cooled to 50° C. Thereafter, 7.6 g of tert-butyl hydroperoxide (10% strength) were added and the reaction mixture was cooled to room temperature. A finely divided polymer dispersion having a solids content of 33.2% was obtained. The mean particle size was 154 nm.

(iii) Emulsion Polymerization 240 g of the stearyldiketene dispersion C were initially taken in a two liter reactor equipped with an anchor stirrer and an apparatus for working under an inert gas atmosphere and were heated to a temperature of 85° C., and 0.75 g of a 10% strength aqueous solution of iron(II) sulfate heptahydrate was added. At this temperature, 34.53 g of an 18% strength aqueous hydrogen peroxide solution and 167.26 g of a mixture of 33.93 g of demineralized water, 0.14 g of emulsifier K 30 (40% strength aqueous solution of a mixture of the sodium salts of alkanesulfonates having an average chain length of $C_{15}$), 93.24 g of styrene and 39.96 g of n-butyl acrylate were metered into the reactor in two separate feeds over a period of 120 minutes. Thereafter, the mixture was stirred for a further 90 minutes at 85° C. and cooled to 50° C., 9.25 g of tert-butyl hydroperoxide were added and the mixture was stirred for 15 minutes at 50° C. After cooling to room temperature (20° C.), a finely divided dispersion having a mean particle size distribution of 201 nm and a solids content of 28.1% was obtained.

EXAMPLE 5

(i) Dispersing

Stearyldiketene Dispersion D 300 g of stearyldiketene, 700 g of demineralized water, 75 g of an oleylamine ethoxylate (solids content=40%, Lipamin® OK) and 28 g of a partly hydrophobed and crosslinked polyethyleneimine (solids content=25%, cf. EP 0811091 B1, example 7) were mixed and were heated to a temperature of 85° C. After this temperature had been reached, the mixture was pre-emulsified with the aid of an UltraTurrax® apparatus at 6000 rpm in the course of 5 minutes, then emulsified at a temperature of 80° C. three times with a homogenizer (APV Gaulin LAB 40, 600 bar) and rapidly cooled to room temperature. A finely divided aqueous dispersion of stearyldiketene having a mean particle size of 135 nm and a solids content of 31.3% was obtained.

(ii) Emulsion Polymerization 31.9 g of a cationized potato starch (DS value=0.48, solids content=90%) were initially taken in a 2 l flask having a plane-ground joint and equipped with stirrer and internal thermometer measurement. 180 g of demineralized water, 1.52 g of α-amylase (1% strength) and 0.8 g of calcium acetate hydrate (25% strength) were added with stirring. The mixture was heated to 85° C., a further 8 g of α-amylase (1% strength) were added and stirring was effected for 23 min at this temperature. Thereafter, 4.0 g of glacial acetic acid and 0.8 g of iron(II) sulfate heptahydrate (10% strength) were added and then 4.0 g of an 18% strength hydrogen peroxide solution in the course of 12 min.

A monomer feed consisting of 120 g of demineralized water, 0.15 g of emulsifier K 30 (40% strength aqueous solution of a mixture of the sodium salt of alkanesulfonates having an average chain length of $C_{15}$), 71.4 g of acrylonitrile and 58.1 g of n-butyl acrylate and 144 g of the stearyldiketene dispersion D was then started. The duration of the monomer feed was 165 min. At the same time, a feed of 16 g of 5% strength hydrogen peroxide solution over a period of 36 min was started and, after the end thereof, a feed of 28 g of 5% strength hydrogen peroxide solution over a period of 180 min. Stirring was effected for a further 60 min at 85° C., a further 4 g of 5% strength hydrogen peroxide solution were then added over a period of 10 min and cooling to 30° C. was effected. 0.31 g of Rongalit® C (40% strength) and 5.73 g of tert-butyl hydroperoxide (10% strength) were then added and the reaction mixture was stirred for a further 30 min. A finely divided polymer dispersion having a solids content of 29.2% and a mean particle size of 195 nm was obtained.

(iii) Emulsion Polymerization 90 g of glacial acetic acid and 4 g of acrylic acid were initially taken in a 2 l flask having a plane-ground joint and equipped with stirrer and internal temperature measurement. At a temperature of 105° C., a) the initiator mixture consisting of 7.06 g of tert-butyl peroctanoate, dissolved in 14.54 g of isopropanol, was metered in in the course of 60 min and b) the monomer mixture consisting of 124 g of styrene and 52 g of dimethylaminoethyl acrylate was metered in in the course of 45 min, over two separate feeds at a temperature of 105° C. with stirring (270 rpm). After the end of the feeds, stirring was effected for a further hour at 105° C. and the mixture was cooled to 95° C. At this temperature, 620 g of hot demineralized water (about 85° C.) were added and the mixture was cooled to 85° C.

Thereafter, 1.2 g of iron(II) sulfate heptahydrate (10% strength) and 2 g of Rongalit® C (40% strength) were added and 16 g of a 5% strength hydrogen peroxide solution were then allowed to run in in the course of 30 min. Thereafter, a monomer feed consisting of firstly 44 g of styrene and 176 g of tert-butyl acrylate and secondly a feed of 400 g of stearyldiketene dispersion D were started, in each case with a feed time of 120 min. At the same time, a feed of 64 g of a 5% strength hydrogen peroxide solution over a period of 150 min was started. After the end of the feeds, the mixture was postpolymerized for 60 min and then cooled to 50° C. Thereafter, 2 g of Rongalit® C (40% strength) were added, stirring was effected for a further 30 min, a further 2 g of Rongalit® C (40% strength) were added, and cooling to 30° C. was then effected. A finely divided polymer dispersion having a solids content of 30.7% and an LT value (0.1%) of 50% was obtained. The mean particle size was 122 nm.

(iv) Emulsion Polymerization 91 g of glacial acetic acid and 4.5 g of acrylic acid were initially taken in a 2 l flask having a plane-ground joint and equipped with stirrer and internal temperature measurement. At a temperature of 105° C., a) the initiator mixture consisting of 7.94 g of tert-butyl peroctanoate, dissolved in 16.36 g of isopropanol, was metered in in the course of 60 min and b) the monomer mixture consisting of 140 g of styrene and 60 g of dimethylaminopropylmethacrylamide was metered in in the course of 45 min, over two separate feeds at a temperature of 105° C. with stirring (270 rpm). After the end of the feeds, stirring was effected for a further hour at 105° C. and the mixture was cooled to 95° C. At this temperature, 860 g of hot demineralized water (about 85° C.) were added and the mixture was cooled to 85° C. At this temperature, 300 g of the stearylketene dispersion D were added.

Thereafter, 1.35 g of iron(II) sulfate heptahydrate (10% strength) and 2.2 g of Rongalit® C (40% strength) were added and 18 g of 5% strength hydrogen peroxide solution were then allowed to run in in the course of 30 min. Thereafter, a monomer feed consisting of 50 g of styrene and 197 g of tert-butyl acrylate with a feed time of 120 min was started. At the same time, a feed of 72 g of a 5% strength hydrogen peroxide solution over a period of 150 min was started. After the end of the feeds, the mixture was postpolymerized for 60 min and then cooled to 50° C. Thereafter, 2.2 g of Rongalit® C (40% strength) were added, stirring was effected for a further 30 min, a further 2.2 g of Rongalit® C (40% strength) were added and cooling was then effected to 30° C. A finely divided polymer dispersion having a solids content of 30.8% and an LT value (0.1%) of 43% was obtained. The mean particle size was 139 nm.

EXAMPLE 6

(i) Dispersing

Isostearyldiketene Dispersion E 120 g of isostearyldiketene, 871.3 g of demineralized water, 8 g of sodium dodecylsulfonate and 7.6 g of a condensate of naphthalenesulfonic acid and formaldehyde (Tamol® NNP) were mixed and were heated to a temperature of 55° C. As soon as this temperature had been reached, the mixture was pre-emulsified with the aid of an UltraTurrax® apparatus at 6000 rpm in the course of 5 minutes and then emulsified at 80° C. three times with a homogenizer (APV Gaulin LAB 40, 300 bar) and rapidly cooled to room temperature. A finely divided aqueous dispersion of isostearyldiketene having a mean particle size distribution of 198 nm and a solids content of 12.4% was obtained.

(ii) Emulsion Polymerization 50.3 g of an oxidized potato starch (solids content=78%) were initially taken in a 2 l flask having a plane-ground joint and equipped with stirrer and internal temperature measurement. 360 g of demineralized water and 0.9 g of calcium acetate hydrate (25% strength) were added with stirring. The mixture was heated to 85° C., 1.6 g of an α-amylase (1% strength) were added and stirring was effected for 18 minutes at this temperature. Thereafter, 8.0 g of glacial acetic acid and 2.3 g of iron(II) sulfate heptahydrate (10% strength) and then, in the course of 10 min, 4 g of a 5% strength hydrogen peroxide solution were added. 143.3 g of the isostearyldiketene emulsion E were added.

Thereafter, a monomer feed consisting of 33 g of demineralized water, 0.18 g of emulsifier K 30 (40% strength aqueous solution of a mixture of the sodium salt of alkanesulfonates having an average chain length of $C_{15}$), 58.4 g of styrene, 29.2 g of n-butyl acrylate and 29.2 g of tert-butyl acrylate was started. The feed time was 90 min. At the same time, a feed of 40 g of 5% strength hydrogen peroxide solution over a period of 120 min was started.

The mixture was postpolymerized for 30 min and then cooled to 65° C. Thereafter, 4 g of tert-butyl hydroperoxide (10% strength) were added for postpolymerization, and the reaction mixture was stirred for 40 minutes and then cooled to 30° C. A finely divided polymer dispersion having a solids content of 21.2% was obtained. The mean particle size was 174 nm.

EXAMPLE 7

(i) Dispersing

Alkenylsuccinic Acid Dispersion F 80 g of alkenylsuccinic anhydride, 871.3 g of demineralized water, 8 g of sodium dodecylsulfonate and 7.6 g of a condensate of naphthalenesulfonic acid and formaldehyde (Tamol® NNP) were mixed and the mixture was pre-emulsified with the aid of an UltraTurrax® apparatus at 6000 rpm in the course of 5 minutes and then emulsified three times with a homogenizer (APV Gaulin LAB 40, 300 bar). A finely divided aqueous dispersion of alkenylsuccinic anhydride having a mean particle size distribution of 301 nm and a solids content of 8.4% was obtained.

(ii) Emulsion Polymerization 0.67 g of calcium acetate hydrate (25% in water), 52.96 g of a cationized potato starch (DS value=0.048, solids content=90%) and 0.21 g of an α-amylase (1% in water) were mixed with 108.36 g of demineralized water in a two liter reactor equipped with an anchor stirrer and an apparatus for working under an inert gas atmosphere. The mixture was heated to 85° C. with stirring and a further 1.89 g of the α-amylase were added. After 30 minutes, the enzymatic degradation was stopped with 2.8 g of glacial acetic acid, and 0.56 g of iron(II) sulfate heptahydrate and 326 g of the alkenylsuccinic anhydride dispersion F described under (i) were added. 26.13 g of an 18% strength aqueous hydrogen peroxide solution and 134.02 g of a mixture of 33.12 g of demineralized water, 0.10 g of emulsifier K 30 (40% strength aqueous solution of a mixture of the sodium salts of alkanesulfonates having an average chain length of $C_{15}$), 70.56 g of styrene and 30.24 g of n-butyl acrylate were metered into the reactor in two separate feeds over a period of 120 minutes. Thereafter, the mixture was stirred for a further 90 minutes at 75° C. and cooled to 50° C., 9.25 g of tert-butyl hydroperoxide were added and the mixture was stirred for 15 minutes at 50° C.

After cooling to room temperature (20° C.), a finely divided dispersion having a mean particle size distribution of 131 nm and a solids content of 24.5% was obtained.

EXAMPLE 8

(i) Dispersing

Oleyldiketene Dispersion G 120 g of oleyldiketene, 871.3 g of demineralized water, 8 g of sodium dodecylsulfonate and 7.6 g of a condensate of naphthalenesulfonic acid and formaldehyde (Tamol® NNP) were mixed and were heated to a temperature of 55° C. As soon as this temperature had been reached, the mixture was pre-emulsified with the aid of an UltraTurrax® apparatus at 6000 rpm in the course of 5 minutes and then emulsified at 80° C. three times with a homogenizer (APV Gaulin LAB 40, 300 bar) and rapidly cooled to room temperature. A finely divided aqueous dispersion of oleyldiketene having a mean particle size distribution of 231 nm and a solids content of 12.4% was obtained.

(ii) Emulsion Polymerization 0.67 g of calcium acetate hydrate (25% in water), 52.96 g of a cationized potato starch (DS value=0.048, solids content=90%) and 0.21 g of an α-amylase (1% in water) were mixed with 108.36 g of demineralized water in a two liter reactor equipped with an anchor stirrer and an apparatus for working under an inert gas atmosphere. The mixture was heated to 85° C. with stirring and a further 1.89 g of the α-amylase were added. After 30 minutes, the enzymatic degradation was stopped with 2.8 g of glacial acetic acid, and 0.56 g of iron(II) sulfate heptahydrate and 326 g of the oleyidiketene dispersion G described under (i) were added.

26.13 g of an 18% strength aqueous hydrogen peroxide solution and 134.02 g of a mixture of 33.12 g of demineralized water, 0.10 g of emulsifier K 30 (40% strength aqueous solution of a mixture of the sodium salts of alkanesulfonates having an average chain length of $C_{15}$), 70.56 g of styrene and 30.24 g of n-butyl acrylate were metered into the reactor in two separate feeds over a period of 120 minutes. Thereafter, the mixture was stirred for a further 90 minutes at 85° C. and cooled to 50° C., 9.25 g of tert-butyl hydroperoxide were added and the mixture was stirred for 15 minutes at 50° C. After cooling to room temperature (20° C.), a finely divided dispersion having a mean particle size distribution of 138 nm and a solids content of 26.5% was obtained.

EXAMPLE 9

(i) Dispersing

Wax Dispersion H 120 g of a wax mixture comprising montanic acid wax and montanic ester (m.p. 68-78° C., Luwax® LG), 871.3 g of demineralized water, 16 g of sodium dodecyl sulfonate and 12.4 g of a condensate of naphthalenesulfonic acid and formaldehyde (Tamol® NNP) were mixed and were heated to a temperature of 85° C. As soon as this temperature had been reached, the mixture was pre-emulsified with the aid of an UltraTurrax® apparatus at 6000 rpm in the course of 5 minutes and then emulsified at 90° C. three times with a homogenizer (APV Gaulin LAB 40, 300 bar) and rapidly cooled to room temperature. A finely divided aqueous wax dispersion having a mean particle size distribution of 296 nm and a solids content of 11.9% was obtained.

(ii) Emulsion Polymerization 430 g of the wax dispersion H were initially taken in a two liter reactor equipped with an anchor stirrer and an apparatus for working under an inert gas atmosphere and were heated to a temperature of 85° C. At this temperature, 23.2 g of a 7% strength aqueous sodium peroxodisulfate solution and a mixture of 33 g of demineralized water, 2.6 g of sodium dodecylbenzenesulfonate (15%) and 133 g of styrene were metered into the reactor in two separate feeds over a period of 150 minutes. Thereafter, the mixture was stirred for a further 90 minutes at 85° C. and cooled to 50° C., 9.25 g of tert-butyl hydroperoxide were added and the mixture was stirred for 15 minutes at 50° C. After cooling to room temperature, a dispersion having a mean particle size distribution of 340 nm and a solids content of 29.7% was obtained.

EXAMPLE 10

(i) Dispersing

Wax Dispersion I 120 g of a polyether wax having a melting range of 47-51° C. (Luwax® V), 871.3 g of demineralized water, 16 g of sodium dodecylsulfonate and 12.4 g of a condensate of naphthalenesulfonic acid and formaldehyde (Tamol® NNP) were mixed and were heated to a temperature of 65° C. As soon as this temperature had been reached, the mixture was pre-emulsified with the aid of an UltraTurrax® apparatus at 6000 rpm in the course of 5 minutes and then emulsified at 85° C. with a homogenizer (APV Gaulin LAB 40, 300 bar) and rapidly cooled to room temperature. A finely divided aqueous wax dispersion having a mean particle size distribution of 265 nm and a solids content of 12.1% was obtained.

(ii) Emulsion Polymerization 300 g of the wax dispersion I were initially taken in a two liter reactor equipped with an anchor stirrer and an apparatus for working under an inert gas atmosphere and were heated to a temperature of 90° C. At this temperature, 23.2 g of a 7% strength aqueous sodium peroxodisulfate solution, over a period of 150 minutes, and a mixture of 30 g of demineralized water, 2.5 g of sodium dodecylbenzenesulfonate (15% strength) and 120 g of methyl methacrylate, in the course of 120 min, were metered into the reactor in two separate feeds. Thereafter, the mixture was stirred for a further 60 minutes at 90° C. and cooled to 50° C., 9.25 g of tert-butyl hydroperoxide were added and the mixture was stirred for 15 minutes at 50° C. After cooling to room temperature, a dispersion having a mean particle size distribution of 340 nm and a solids content of 31.0% was obtained.

Test Methods

The determination of the degree of sizing was effected by Cobb60 according to DIN EN 20 535. The HST value was determined by the Hercules Sizing Test according to Tappi standard T 530. The infiltration test was carried out according to DIN 53 126 using a blue paper test ink. The toner adhesion was carried out using an IGT tester according to method EN 12 283.

Testing of Performance Characteristics as Surface Size

An anionically modified potato starch was brought into solution with heating to 95° C. for 30 minutes. Thereafter, the polymer dispersion to be tested was added to the starch solution and the solution was diluted with water so that a starch concentration of 8% was present in the final mixture. The mixture of starch solution and polymer dispersion was then applied by means of a size press to a wood-free, unsized paper having a grammage of 80 g/m² at a temperature of 55° C. The take-up of the preparation was in the range of 50-60%. Thereafter, the papers thus treated were dried by means of contact drying at 90° C., conditioned for 24 h at 50% relative humidity and then subjected to the abovementioned tests.

For comparison with the prior art, a commercially available aqueous size dispersion (Basoplast® 400DS) based on a styrene/butyl acrylate polymer was additionally tested (comparative example 1). The solids content of the dispersion was 24.9% and the particle size distribution was 101 nm.

The results obtained in the tests are shown in the table.

TABLE

| Dispersion prepared acc. to | Cobb 60 [g/m²] | | HST [sec] | | Toner adhesion [% ink density] |
|---|---|---|---|---|---|
| | 1 g/l | 2 g/l | 1 g/l | 2 g/l | |
| Example 1 (ii) | 32 | 23 | 78 | 298 | 82 |
| Example 1 (iii) | 34 | 21 | 102 | 312 | 85 |
| Example 3 (ii) | 35 | 25 | 24 | 214 | 84 |
| Example 4 (ii) | 36 | 24 | 45 | 287 | 86 |
| Example 4 (iii) | 35 | 23 | 69 | 258 | 81 |
| Example 5 (ii) | 34 | 25 | 68 | 235 | 82 |
| Example 5 (iii) | 35 | 26 | 54 | 265 | 84 |
| Example 5 (iv) | 32 | 22 | 86 | 345 | 86 |
| Example 6 (ii) | 34 | 24 | 59 | 284 | 81 |
| Example 7 (ii) | 42 | 29 | 43 | 187 | 91 |
| Example 8 (ii) | 39 | 28 | 47 | 201 | 81 |
| Comparative example 1 | 52 | 30 | 5 | 112 | 87 |

We claim:

1. A process for the preparation of an aqueous polymer dispersion, comprising:
   (i) preparing an aqueous dispersion of at least one lipophilic active substance which is an alkyldiketene and/or an alkenylsuccinic anhydride, and which has a water solubility of not more than 5 g/l (determined at 25° C. and 1013 mbar) and a melting point below 130° C. in a state of an aqueous emulsion which further comprises at least one dispersion stabilizer, whereby an aqueous dispersion of the lipophilic active substance having a mean particle size of not more than 1000 nm is formed; and
   (ii) combining said aqueous dispersion (i) with a monomer composition which comprises at least 80% by weight of a neutral, monoethylenically unsaturated monomer emulsifiable in water and emulsion polymerizing the monoethylenically unsaturated monomer in the aqueous dispersion of the lipophilic active (i).

2. The process according to claim 1, wherein in component (i) said at least one lipophilic active substance has a melting point below 100° C., and said aqueous dispersion of the active substance contains particles that have a mean particle size of not more than 500 nm.

3. The process according to claim 1, wherein, in step (i), a melt of at least one lipophilic active substance is emulsified in an aqueous solution comprising at least one dispersion stabilizer.

4. The process according to claim 1, wherein the dispersion stabilizer is at least one cationic, anionic or nonionic surfactant, a protective colloid and/or a dispersant.

5. The process according to claim 1, wherein the dispersion stabilizer is at least one selected from the group consisting of condensates of naphthalenesulfonic acid and formaldehyde, amphiphilic polymers and/or nanoparticles of organic polymers and of inorganic compounds.

6. The process according to claim 1, wherein the dispersion stabilizer is at least one protective colloid selected from the group consisting of the polyvinyl alcohols, polyvinylpyrrolidones, polyacrylic acid, polyalkylene glycols, polyalkylene glycols endcapped at one or both ends with alkyl, carboxyl or amino groups, polydiallyldimethylammonium chlorides, water-soluble starches, water-soluble starch derivatives and/or water-soluble proteins.

7. The process according to claim 1, wherein the dispersion stabilizer is a mixture of a surfactant and at least one dispersant comprising a condensate of naphthalenesulfonic acid and formaldehyde and/or at least one protective colloid.

8. The process according to claim 1, wherein the dispersion stabilizer is a mixture of an anionic surfactant and at least one dispersant comprising a condensate of naphthalenesulfonic acid and formaldehyde or at least one protective colloid.

9. The process according to claim 1, wherein the dispersion stabilizer is a degraded starch.

10. The process according to claim 1, wherein the dispersion stabilizer is present in an amount ranging from 0.01 to 20% by weight, based on the dispersion.

11. The process according to claim 1, wherein the at least one lipophilic active substance is present in an amount ranging from 1 to 60% by weight, based on the dispersion.

12. The process according to claim 1, wherein the particles have a mean particle size of from 40 to 200 nm.

13. The process according to claim 1, wherein said monomer composition comprises at least 95% by weight of said neutral, monoethylenically unsaturated monomer.

14. The process according to claim 1, wherein said monomer composition comprises at least 99.9% by weight of said neutral, monoethylenically unsaturated monomer.

15. The process according to claim 1, wherein at least 70% by weight of said neutral, monoethylenically unsaturated monomer is a vinyl aromatic monomer or a mixture of a vinyl aromatic monomer and a $C_2$-$C_8$ alkyl acrylate or a $C_2$-$C_4$ alkyl methacrylate.

* * * * *